(12) United States Patent
Gambetta et al.

(10) Patent No.: US 11,748,665 B2
(45) Date of Patent: Sep. 5, 2023

(54) QUANTUM FEATURE KERNEL ALIGNMENT

(71) Applicant: International Business Machines Corporation, Armonk, NY (US)

(72) Inventors: Jay M. Gambetta, Yorktown Heights, NY (US); Jennifer Ranae Glick, White Plains, NY (US); Paul Kristan Temme, Ossining, NY (US); Tanvi Pradeep Gujarati, San Jose, CA (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 886 days.

(21) Appl. No.: 16/374,354

(22) Filed: Apr. 3, 2019

(65) Prior Publication Data

US 2020/0320437 A1     Oct. 8, 2020

(51) Int. Cl.
  *G06N 20/10*     (2019.01)
  *G06N 10/00*     (2022.01)

(52) U.S. Cl.
  CPC ............. *G06N 20/10* (2019.01); *G06N 10/00* (2019.01)

(58) Field of Classification Search
  CPC ........ G06N 10/00; G06N 20/00; G06N 10/20; G06N 10/40; G06N 10/60; G06N 10/70; G06N 10/80
  See application file for complete search history.

(56) References Cited

U.S. PATENT DOCUMENTS

| | | | |
|---|---|---|---|
| 7,299,213 B2 | 11/2007 | Cristianini | |
| 9,020,874 B2 | 4/2015 | Zhang et al. | |
| 9,990,592 B2 | 6/2018 | Peredriy et al. | |
| 10,056,908 B2 | 8/2018 | Rigetti et al. | |
| 10,325,218 B1* | 6/2019 | Zeng ...................... | G06N 10/00 |
| 2017/0286858 A1 | 10/2017 | La Cour et al. | |

(Continued)

FOREIGN PATENT DOCUMENTS

EP     1770612 B1     12/2016

OTHER PUBLICATIONS

Bergholm, Ville, et al. "Pennylane: Automatic differentiation of hybrid quantum-classical computations." arXiv preprint arXiv: 1811.04968 (2018). (Year: 2018).*

(Continued)

*Primary Examiner* — Markus A. Vasquez
(74) *Attorney, Agent, or Firm* — Garg Law Firm, PLLC; Rakesh Garg; Erik Johnson

(57) ABSTRACT

The illustrative embodiments provide a method, system, and computer program product for quantum feature kernel alignment using a hybrid classical-quantum computing system. An embodiment of a method for hybrid classical-quantum decision maker training includes receiving a training data set. In an embodiment, the method includes selecting, by a first processor, a sampling of objects from the training set, each object represented by at least one vector.

In an embodiment, the method includes applying, by a quantum processor, a set of quantum feature maps to the selected objects, the set of quantum maps corresponding to a set of quantum kernels. In an embodiment, the method includes evaluating, by a quantum processor, a set of parameters for a quantum feature map circuit corresponding to at least one of the set of quantum feature maps.

20 Claims, 12 Drawing Sheets

(56) References Cited

U.S. PATENT DOCUMENTS

2019/0244009 A1* 8/2019 Moussaffi ............... G06N 5/02
2020/0272926 A1* 8/2020 Chaplin ............... G06F 9/3885
2020/0274554 A1* 8/2020 Aspuru-Guzik ....... G06N 20/00

OTHER PUBLICATIONS

Bergholm, Ville, et al. "Q3b_variational-classifier-iris". Retrieved from https://github.com/PennyLaneAI/pennylane/releases/tag/v0.1.0 on Feb. 14, 2022. Source Code zip file. pennylane-0.1.0/examples/Q3b_variational-classifier-iris. Nov. 12, 2018. (Year: 2018).*

Bergholm, Ville, et al. "Basic tutorial: qubit rotation". Retrieved from https://github.com/PennyLaneAI/pennylane/releases/tag/v0.1.0 on Feb. 14, 2022. Source Code zip file. pennylane-0.1.0/doc/tutorials/qubit_rotation.rst. Nov. 12, 2018. (Year: 2018).*

Schuld, Maria, and Nathan Killoran. "Quantum machine learning in feature Hilbert spaces." arXiv preprint arXiv:1803.07128 (2018). (Year: 2018).*

Brummer, G., R. Rafique, and T. A. Ohki. "Phase and Amplitude Modulator for Microwave Pulse Generation." IEEE Transactions on Applied Superconductivity 3.21 (2011): 583-586. (Year: 2011).*

Baylor, Denis, et al. "Tfx: A tensorflow-based production-scale machine learning platform." Proceedings of the 23rd ACM SIGKDD International Conference on Knowledge Discovery and Data Mining. 2017. (Year: 2017).*

Du, Y., et al. "The expressive power of parameterized quantum circuits. arXiv 2018." arXiv preprint arXiv:1810.11922. (Year: 2018).*

Killoran, Nathan, et al. "Continuous-variable quantum neural networks." arXiv preprint arXiv:1806.06871 (2018). (Year: 2018).*

Technopedia. "Electronic Software Distribution (ESD)". Article from Jan. 5, 2019 retrieved via web.archive.org. https://web.archive.org/web/20190105173821/https://Avww.techopedia.com/definition/1502/electronic-software-distribution-esd. Retrieved Jan. 10, 2022. (Year: 2019).*

Nasios et al., "Kernel-based classification using quantum mechanics", Elsevier 2006. https://www-users.cs.york.ac.uk/adrian/Papers/Journals/PR07.pdf.

Nello Cristianini et al., On Kernel-Target Alignment, 2002.

Corinna Cortes et al., Algorithms for Learning Kernels Based on Centered Alignment, Journal of Machine Learning Research, 2012.

Brian Bullins et al., Not-So-Random Features, Department of Computer Science Princeton University, Feb. 27, 2018.

Vojtech Havlicek, et al., Supervised learning with quantum enhanced feature spaces, Apr. 30, 2018.

James C. Spall, et al., Multivariate Stochastic Approximation Using a Simultaneous Perturbation Gradient Approximation, IEEE Mar. 1992.

Bergholm et al., "PennyLane: Automatic differentiation of hybrid quantum-classical computations", Feb. 20, 2019.

Havlicek et al., "Supervised learning with quantum-enhanced feature spaces", Jun. 5, 2018.

Du et al., "The Expressive Power of Parameterized Quantum Circuits", Oct. 29, 2018.

Schuld et al., "Quantum machine learning in feature Hilbert spaces", Mar. 19, 2018.

P0037098AU, Application No. 2020250811, Examination report No. 1 for standard patent application, dated Aug. 26, 2022.

P0037098AU, Application No. 2020250811, Notice of Acceptance for patent application, dated Jun. 7, 2023.

* cited by examiner

QUANTUM FEATURE KERNEL ALIGNMENT

TECHNICAL FIELD

The present invention relates generally to quantum classifier training using quantum computing. More particularly, the present invention relates to a system and method for quantum feature kernel alignment for classifier and other quantum decision making system training using a hybrid classical-quantum computing system.

BACKGROUND

Hereinafter, a "Q" prefix in a word or phrase is indicative of a reference of that word or phrase in a quantum computing context unless expressly distinguished where used.

Molecules and subatomic particles follow the laws of quantum mechanics, a branch of physics that explores how the physical world works at the most fundamental levels. At this level, particles behave in strange ways, taking on more than one state at the same time, and interacting with other particles that are very far away. Quantum computing harnesses these quantum phenomena to process information.

The computers we commonly use today are known as classical computers (also referred to herein as "conventional" computers or conventional nodes, or "CN"). A conventional computer uses a conventional processor fabricated using semiconductor materials and technology, a semiconductor memory, and a magnetic or solid-state storage device, in what is known as a Von Neumann architecture. Particularly, the processors in conventional computers are binary processors, i.e., operating on binary data represented by 1 and 0.

A quantum processor (q-processor) uses the unique nature of entangled qubit devices (compactly referred to herein as "qubit," plural "qubits") to perform computational tasks. In the particular realms where quantum mechanics operates, particles of matter can exist in multiple states—such as an "on" state, an "off" state, and both "on" and "off" states simultaneously. Where binary computing using semiconductor processors is limited to using just the on and off states (equivalent to 1 and 0 in binary code), a quantum processor harnesses these quantum states of matter to output signals that are usable in data computing.

Conventional computers encode information in bits. Each bit can take the value of 1 or 0. These 1s and 0s act as on/off switches that ultimately drive computer functions. Quantum computers, on the other hand, are based on qubits, which operate according to two key principles of quantum physics: superposition and entanglement. Superposition means that each qubit can represent both a 1 and a 0 inference between possible outcomes for an event. Entanglement means that qubits in a superposition can be correlated with each other in a non-classical way; that is, the state of one (whether it is a 1 or a 0 or both) can depend on the state of another, and that there is more information contained within the two qubits when they are entangled than as two individual qubits.

Using these two principles, qubits operate as processors of information, enabling quantum computers to function in ways that allow them to solve certain difficult problems that are intractable using conventional computers.

In conventional circuits, Boolean logic gates arranged in succession manipulate a series of bits. The technology for optimizing the gate-logic for binary computations is well-known. Circuit optimization software for conventional circuits aims to increase efficiency and decrease complexity of conventional circuits. Circuit optimization software for conventional circuits functions in part by decomposing the overall desired behavior of the conventional circuit into simpler functions. The conventional circuit optimization software more easily manipulates and processes the simpler functions. The circuit optimization software generates an efficient layout of design elements on the conventional circuit. As a result, circuit optimization software for conventional circuits significantly reduces resource demands, thereby increasing efficiency and decreasing complexity.

The illustrative embodiments recognize that in quantum circuits, quantum gates manipulate qubits to perform quantum computations. Quantum gates are unitary matrix transformations acting on qubits. Due to the superposition and entanglement of qubits, quantum gates represent a $2^n$ by $2^n$ matrix, where n is the number of qubits the quantum gate manipulates. The illustrative embodiments recognize that the decomposition of such matrix transformations quickly becomes too complex to perform by hand due to the exponential increase in the size of the matrix transformations with the number of qubits. For example, quantum computers with 2 qubits require a 4 by 4 matrix operator for quantum gate representation. A quantum computer with 10 qubits require a 1024 by 1024 matrix operator for quantum gate representation. As a result of the exponential increase, manual quantum logic gate matrix transformations quickly become unmanageable as the number of qubits increases.

Circuit optimization for quantum circuits depends on the chosen function, resource requirements, and other design criteria for the quantum circuit. For instance, quantum circuits are often optimized to work with a specific device. Therefore, there is a need for improved methods for compilation methods of quantum circuits.

A quantum algorithm represents a set of instructions to be performed on a quantum computer. The illustrative embodiments recognize that quantum algorithms can be modeled as a quantum circuit. A quantum circuit is a computation model formed of a set of quantum logic gates which perform the steps of the corresponding quantum algorithm.

In machine learning, a classical support vector machine (SVM) is a supervised learning model associated with learning algorithms that classify data into categories. Typically, a set of training examples are each marked as belonging to a category, and an SVM training algorithm builds a model that assigns new examples to a particular category. An SVM model is a representation of the examples as points in a feature space mapped so that the examples of the separate categories are divided by a gap in the feature space. The feature map refers to mapping of a collection of features that are representative of one or more categories. The feature map is constructed by specifying a function called a kernel, which computes the inner products between each pair of data points in the feature space. Using an SVM algorithm, new input data is mapped into the same feature space and predicted to belong to a category based upon a distance from the new example to the examples representative of a category utilizing the feature map. Typically, an SVM performs classification by finding a hyperplane that maximizes the margin between two classes. A hyperplane is a subspace whose dimension is one less than that of its ambient space, e.g., a three-dimensional space has two-dimensional hyperplanes.

The illustrative embodiment recognizes that a quantum decision making system, such as a quantum classifier, a quantum regressor, a quantum controller or a quantum predictor, may be used to analyze input data and make a decision regarding the input data by a quantum classifier. For example, a quantum classifier, such as a quantum support vector machine (QSVM), may be used to analyze input data and determine a discrete classification of the input data by a quantum processor. Quantum processors are capable of generating feature maps that are difficult to estimate classically. The quantum feature map is constructed by specifying a function called a quantum kernel which computes the inner products between each pair of data points in the quantum feature space. In other examples, a regressors, controllers, or predictors may operate on continuous space entities. A quantum classifier, such as a QSVM, implements a classifier using a quantum processor which has the capability to increase the speed of classification of certain input data. The illustrative embodiments recognize that training a quantum classifier and other quantum decision making systems typically require a large sample of input data.

A class of problems exists called optimization problems. An optimization problem is a computational problem in which the best or optimal solution is to be determined for a different problem where the different problem has several possible solutions. For example, the different problem can be the famous traveling salesman problem where a route has to be determined between several cities such that a traveling salesman covers each of the of cities without revisiting any of the cities. This problem has many possible solutions—routes between the cities. An optimization problem related to the traveling salesman problem is to find the shortest—i.e., the best or most optimal route—from the many possible routes, each of which satisfies the requirements of the traveling salesman problem.

Configuring an optimization problem for execution on a computer so that the computer can compute the optimal solution in finite time is a difficult problem in itself. Until recently, the only computing resources available for executing optimization problems were the conventional computers as described herein. Many optimization problems are too difficult or too complex for conventional computers to compute in finite time with reasonable resources. Generally, an approximated solution which can be computed in reasonable time and with reasonable resources is accepted as the near-optimal solution in such cases.

The advent of quantum computing has presented advancement possibilities in many areas of computing, including the computation of optimization problems. Because a quantum computing system can evaluate many solutions from the solution space at once, the illustrative embodiments recognize that such systems are particularly suitable for solving optimization problems.

The illustrative embodiments recognize that the kernel determines the geometrical structure of the mapped data in the feature space. The illustrative embodiments further recognize that the kernel thereby has a central effect on the performance of the machine learning algorithm. The illustrative embodiments recognize that kernel alignment is one presently available technique for classical machine learning algorithms to assess the quality of a kernel for a given data set. Kernel alignment measures the degree of agreement between a given kernel and a given learning task of a classical machine learning algorithm. The illustrative embodiments recognize that optimization of a kernel to a given data set increases the accuracy of the machine learning model.

SUMMARY

The illustrative embodiments provide a method, system, and computer program product for quantum feature kernel alignment using a hybrid classical-quantum computing system. An embodiment of a method for hybrid classical-quantum decision maker training includes receiving a training data set. In an embodiment, the method includes selecting, by a first processor, a sampling of objects from the training set, each object represented by at least one vector.

In an embodiment, the method includes applying, by a quantum processor, a set of quantum feature maps to the selected objects, the set of quantum maps corresponding to a set of quantum kernels. In an embodiment, the method includes evaluating, by a quantum processor, a set of parameters for a quantum feature map circuit corresponding to at least one of the set of quantum feature maps.

In an embodiment, the method includes determining, by the first processor, a new set of parameters for the quantum feature map circuit. In an embodiment, the method includes parameterizing, by the first processor, the quantum feature map circuit with the new set of parameters.

In an embodiment, the method includes varying an amplitude of a microwave pulse of the quantum processor to parameterize the quantum feature map circuit. In an embodiment, the method includes varying a phase of a microwave pulse of the quantum processor to parameterize the quantum feature map circuit.

In an embodiment, the method includes determining that the new set of parameters produces a measure of accuracy greater than a predetermined threshold value. In an embodiment, the method includes applying the parameterized quantum feature map circuit to the selected sampled objects to compute new output vectors.

In an embodiment, the quantum feature map circuit includes a set of single qubit rotation gates. In an embodiment, a subset of the set of single qubit rotation gates include a rotation angle. In an embodiment, the rotation angle corresponds to the new set of parameters. In an embodiment, the first processor is a classical processor.

In an embodiment, the method is embodied in a computer program product comprising one or more computer-readable storage devices and computer-readable program instructions which are stored on the one or more computer-readable tangible storage devices and executed by one or more processors.

An embodiment includes a computer usable program product. The computer usable program product includes a computer-readable storage device, and program instructions stored on the storage device.

An embodiment includes a computer system. The computer system includes a processor, a computer-readable memory, and a computer-readable storage device, and program instructions stored on the storage device for execution by the processor via the memory.

In an embodiment, the program instructions are stored in a computer readable storage device in a data processing system, and the program instructions are transferred over a network from a remote data processing system.

In an embodiment, the program instructions are stored in a computer readable storage device in a server data processing system, and the program instructions are downloaded over a network to a remote data processing system for use in a computer readable storage device associated with the remote data processing system.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
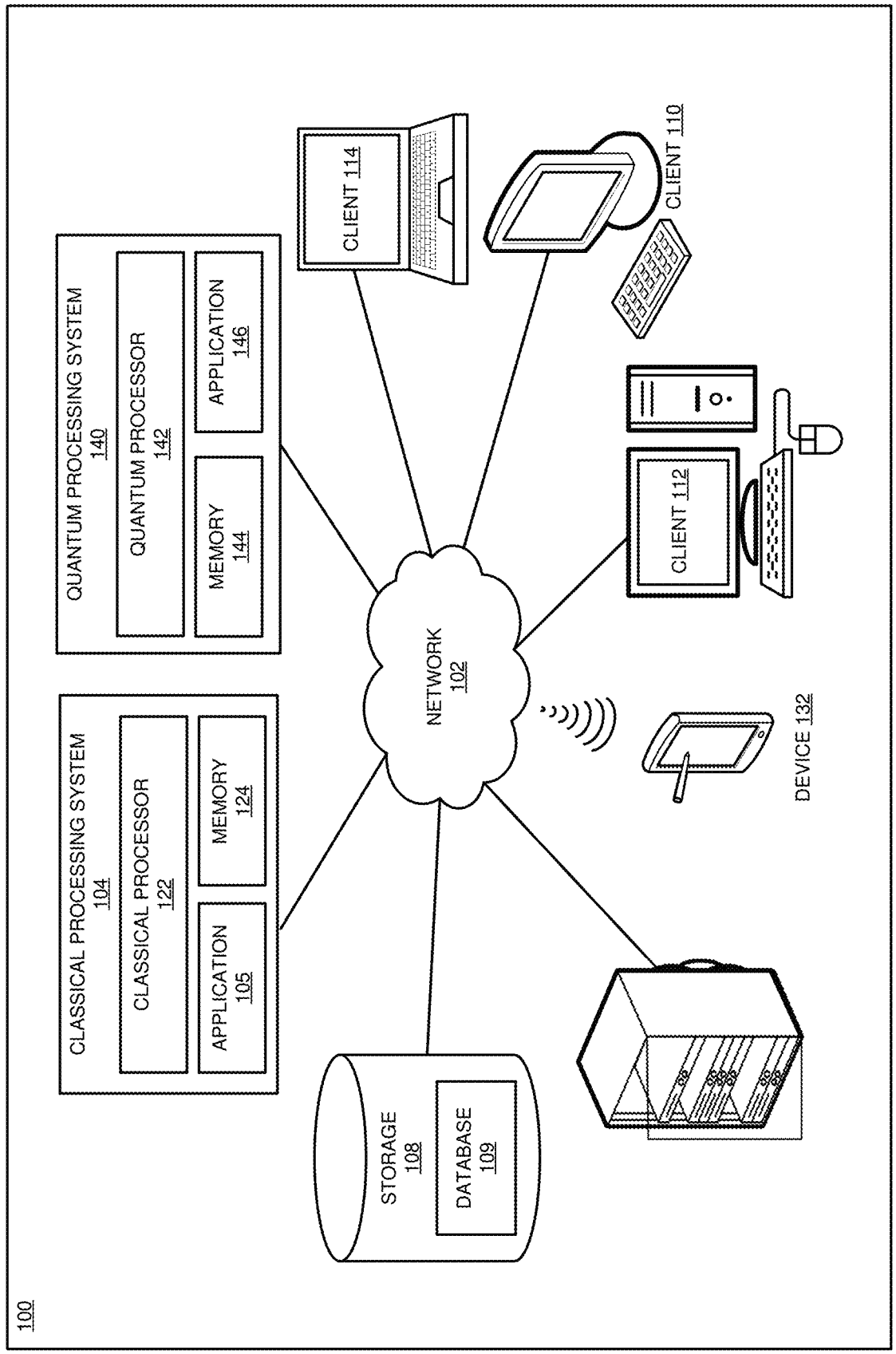
FIG. 1 depicts a block diagram of a network of data processing systems in which illustrative embodiments may be implemented.

The illustrative embodiments used to describe the invention generally address and solve the above-described problem of solving computational problems using quantum computing. The illustrative embodiments provide a method and system for quantum feature kernel alignment using a hybrid classical-quantum computing system.

An embodiment provides a method for quantum feature kernel alignment using hybrid classical-quantum computing system. Another embodiment provides a conventional or quantum computer usable program product comprising a computer-readable storage device, and program instructions stored on the storage device, the stored program instructions comprising a method for quantum feature kernel alignment using hybrid classical-quantum computing system. The instructions are executable using a conventional or quantum processor. Another embodiment provides a computer system comprising a conventional or quantum processor, a computer-readable memory, and a computer-readable storage device, and program instructions stored on the storage device for execution by the processor via the memory, the stored program instructions comprising a method for quantum feature kernel alignment using hybrid classical-quantum computing system.

One or more embodiments provide for a mixed classical and quantum methodology that co-evolves quantum kernels and classical kernel alignment optimization. In one or more embodiments, a classical computer is used to store a large data set associated with classification training data and perform kernel alignment optimization, and a quantum computer is used to simultaneously evaluate a quality of the quantum kernels.

In an embodiment, it is assumed that a QSVM is accurate with the right quantum kernel constructing the corresponding right feature map. In the embodiment, a limited set of quantum kernels are obtained. In particular embodiments, the quantum kernels may be based upon a circuit description of a quantum circuit. In an embodiment, a classical computer tunes a quantum feature map to a data set. In an embodiment, a classical computer varies parameters of a quantum circuit to tune a quantum feature map to a data set.

For fixed $\alpha$, the SVM objective (F) is equivalent to kernel alignment $\gamma_k$:

$$F(\alpha, \lambda_k) = 1^T \alpha - \frac{1}{2} \alpha^T Y K_{\lambda_k} Y \alpha = 1^T \alpha - \frac{1}{2} \gamma_k(\alpha).$$

The illustrative embodiments recognize that support vector weights, $\alpha$, are not fixed. Given a kernel, k, the support vector weights are chosen to maximize F. The margin-maximizing kernel is learned by maximizing alignment:

$$\min_\lambda \max_\alpha F(\alpha, \lambda_k)$$

subject to the constraint $0 \leq \alpha \leq C$, $\gamma^T \alpha = 0$.

A classical optimization program running on a classical processor learns the margin-maximizing kernel by receiving as input a set of training samples S: $(x_i, y_i)$, i=1, . . . , n subject to a set of parameters box constraint C, number of steps T, number of gradient ascent steps M with step sizes $\{\eta_t\}$, size n'<n of subsampled training set $S_t' \subset S$. A set of random kernel parameters are initialized, parameters $\lambda \in \mathbb{R}^m$, random support vector weights $\alpha =$ $$Proj\left[\frac{C}{2}1\right] \in \mathbb{R}^{n'}$$

$\alpha_+ = \alpha$ and $\alpha_- = \alpha$. The optimization program performs the steps for t=1, . . . , T:

Generate subset $S_t' \subset S$ by stochastically sampling from S;
Generate random vector $\Delta \in \{-1,1\}^m$;
Compute $\lambda_+ = \lambda + c_{SPSA, t} \Delta$ and $\lambda_- = \lambda - c_{SPSA, t} \Delta$ for a constant $c_{SPSA, t}$;
Compute quantum kernel matrices $K_+ = K(\lambda_+, S_t')$ and $K_- = K(\lambda_-, S_t')$ on quantum device;
Compute gradients $g_{+, t} = \nabla_\alpha F(\alpha_{+, t}, \lambda_{+, t})$ using $K_+$, and $g_{-, t} = \nabla_\alpha F(\alpha_{-, t}, \lambda_{-, t})$ using $K_-$;
Update $\alpha_{+, t+1} \leftarrow Proj[\alpha_{+, t} + \eta_t g_{+, t}]$ and $\alpha_{-, t+1} \leftarrow Proj[\alpha_{-, t} + \eta_t g_{-, t}]$ via M-step gradient ascent;

Update $\lambda$ via SPSA optimization using cost function $F(\alpha_{+,t}, \lambda_{+,t})$ and $F(\alpha_{-,t}, \lambda_{-,t})$.

An embodiment computes the kernel matrix $K(\lambda^*, S)$ with optimized parameters $\lambda^*$. An embodiment computes support vector weights, bias, and support vectors by solving the standard SVM quadratic program.

In an embodiment, a method optimizes the value of the SVM objection function F. In an embodiment, the method minimizes the value of F with respect to a set of quantum kernel parameters. In an embodiment, the method maximizes F with respect to alignment. In an embodiment, the method maximizes the alignment for a quantum kernel family.

Accordingly, one or more embodiments provide for a system and method that selects a quantum feature map for a data set. Various embodiments provide for a classical/quantum methodology that co-evolves quantum kernels and the classical kernel alignment functions, and the quantum computer is used to simultaneously evaluate the quality of the quantum kernels.

For the clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or component that are not shown or described herein, or structures or components different from those shown but for a similar function as described herein may be present without departing the scope of the illustrative embodiments.

Furthermore, the illustrative embodiments are described with respect to specific actual or hypothetical components only as examples. The steps described by the various illustrative embodiments can be adapted for enhancing quantum classification using a variety of components that can be purposed or repurposed to provide a described function within a data processing environment, and such adaptations are contemplated within the scope of the illustrative embodiments.

The illustrative embodiments are described with respect to certain types of steps, applications, classical processors, quantum processors, quantum states, classical feature spaces, quantum feature spaces, classical kernels, quantum kernels, and data processing environments only as examples. Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
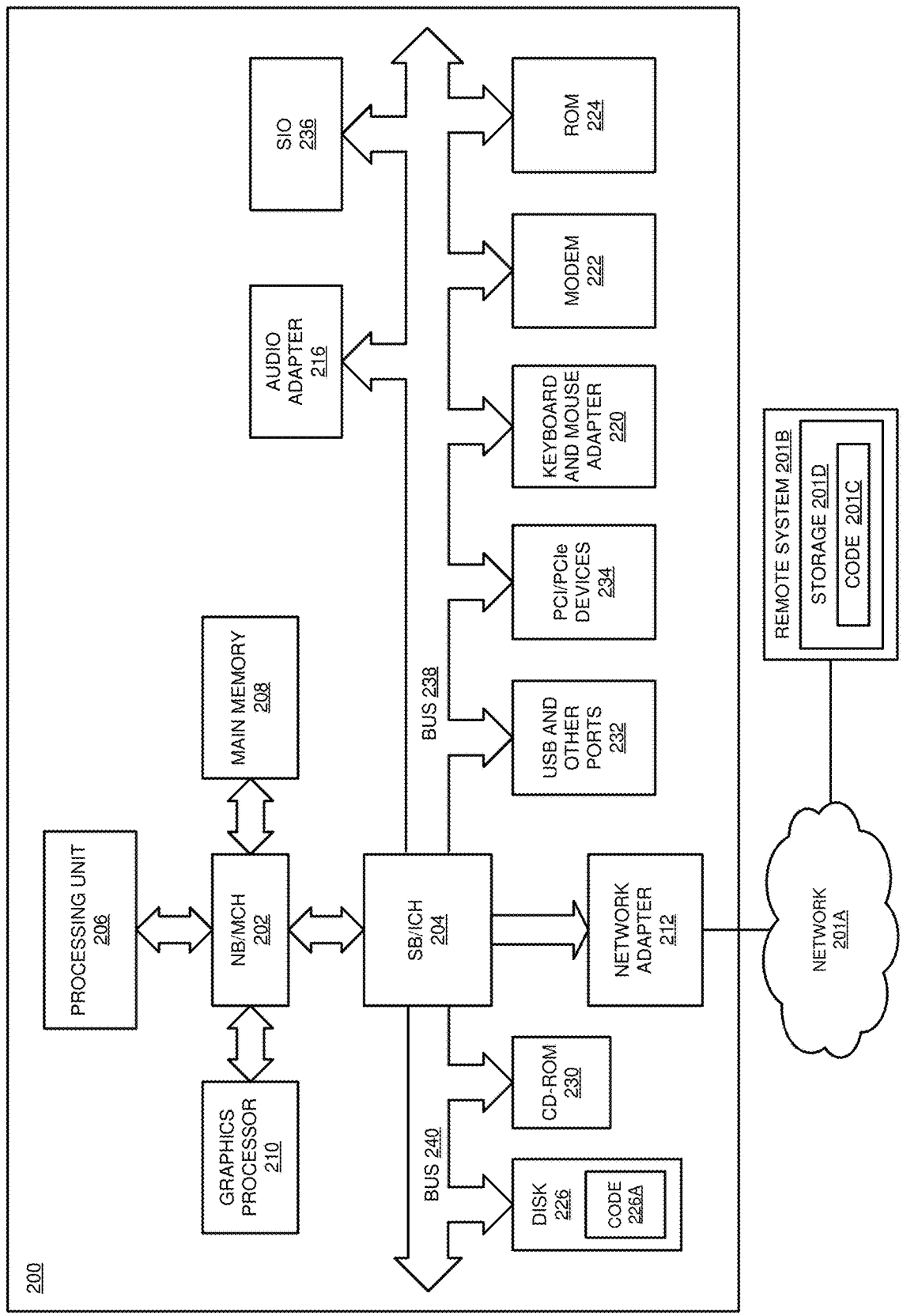
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Classical processing system 104 couples to network 102. Classical processing system 104 is a classical processing system. Software applications may execute on any quantum data processing system in data processing environment 100. Any software application described as executing in classical processing system 104 in FIG. 1 can be configured to execute in another data processing system in a similar manner. Any data or information stored or produced in classical processing system 104 in FIG. 1 can be configured to be stored or produced in another data processing system in a similar manner. A classical data processing system, such as classical processing system 104, may contain data and may have software applications or software tools executing classical computing processes thereon.

Server 106 couples to network 102 along with storage unit 108. Storage unit 108 includes a database 109 configured to store classifier training data as described herein with respect to various embodiments. Server 106 is a conventional data processing system. Quantum processing system 140 couples to network 102. Quantum processing system 140 is a quantum data processing system. Software applications may execute on any quantum data processing system in data processing environment 100. Any software application described as executing in quantum processing system 140 in FIG. 1 can be configured to execute in another quantum data processing system in a similar manner. Any data or information stored or produced in quantum processing system 140 in FIG. 1 can be configured to be stored or produced in another quantum data processing system in a similar manner. A quantum data processing system, such as quantum processing system 140, may contain data and may have software applications or software tools executing quantum computing processes thereon.

Clients 110, 112, and 114 are also coupled to network 102. A conventional data processing system, such as server 106, or client 110, 112, or 114 may contain data and may have software applications or software tools executing conventional computing processes thereon.

Only as an example, and without implying any limitation to such architecture, FIG. 1 depicts certain components that are usable in an example implementation of an embodiment. For example, server 106, and clients 110, 112, 114, are depicted as servers and clients only as example and not to imply a limitation to a client-server architecture. As another example, an embodiment can be distributed across several conventional data processing systems, quantum data processing systems, and a data network as shown, whereas another embodiment can be implemented on a single conventional data processing system or single quantum data processing system within the scope of the illustrative embodiments. Conventional data processing systems 106, 110, 112, and 114 also represent example nodes in a cluster, partitions, and other configurations suitable for implementing an embodiment.

Device 132 is an example of a conventional computing device described herein. For example, device 132 can take the form of a smartphone, a tablet computer, a laptop computer, client 110 in a stationary or a portable form, a wearable computing device, or any other suitable device. Any software application described as executing in another conventional data processing system in FIG. 1 can be configured to execute in device 132 in a similar manner. Any data or information stored or produced in another conventional data processing system in FIG. 1 can be configured to be stored or produced in device 132 in a similar manner.

Server 106, storage unit 108, classical processing system 104, quantum processing system 140, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 106 may provide data, such as boot files, operating system images, and applications to clients 110, 112, and 114. Clients 110, 112, and 114 may be clients to server 106 in this example. Clients 110, 112, 114, or some combination thereof, may include their own data, boot files, operating system images, and applications. Data processing environment 100 may include additional servers, clients, and other devices that are not shown.

In the depicted example, memory 124 may provide data, such as boot files, operating system images, and applications to classical processor 122. Classical processor 122 may include its own data, boot files, operating system images, and applications. Data processing environment 100 may include additional memories, quantum processors, and other devices that are not shown. Memory 124 includes application 105 that may be configured to implement one or more of the classical processor functions described herein for quantum feature kernel alignment on a hybrid classical-quantum computing system in accordance with one or more embodiments.

In the depicted example, memory 144 may provide data, such as boot files, operating system images, and applications to quantum processor 142. Quantum processor 142 may include its own data, boot files, operating system images, and applications. Data processing environment 100 may include additional memories, quantum processors, and other devices that are not shown. Memory 144 includes application 146 that may be configured to implement one or more of the quantum processor functions described herein in accordance with one or more embodiments.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a conventional client data processing system and a conventional server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a conventional computer, such as classical processing system 104, server 106, or clients 110, 112, and 114 in FIG. 1, or another type of device in which computer usable program code or instructions implementing the processes may be located for the illustrative embodiments.

Data processing system 200 is also representative of a conventional data processing system or a configuration therein, such as conventional data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
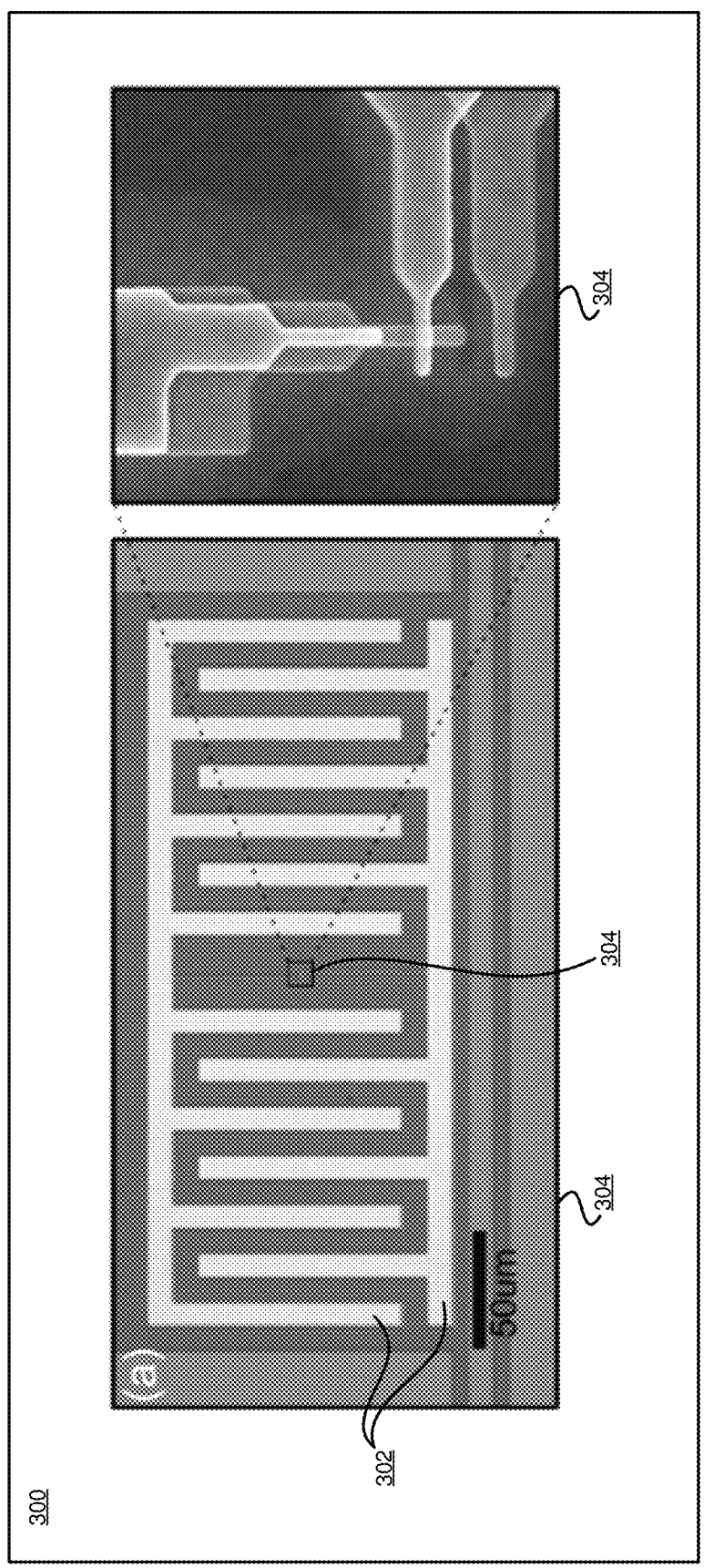
FIG. 3 depicts a qubit for use in a quantum processor in accordance with an illustrative embodiment.

With reference to FIG. 3, this figure depicts a qubit for use in a quantum processor (e.g., quantum processor 148 in FIG. 1). Qubit 300 includes capacitor structure 302 and Josephson junction 304. Josephson junction 304 is formed by separating two thin-film superconducting metal layers by a non-superconducting material. When the metal in the superconducting layers is caused to become superconducting—e.g. by reducing the temperature of the metal to a specified cryogenic temperature—pairs of electrons can tunnel from one superconducting layer through the non-superconducting layer to the other superconducting layer. In the superconducting qubit 300, the Josephson junction 304—which has a small inductance—is electrically coupled in parallel to capacitor structure 302, forming a nonlinear resonator.

Figure 4:
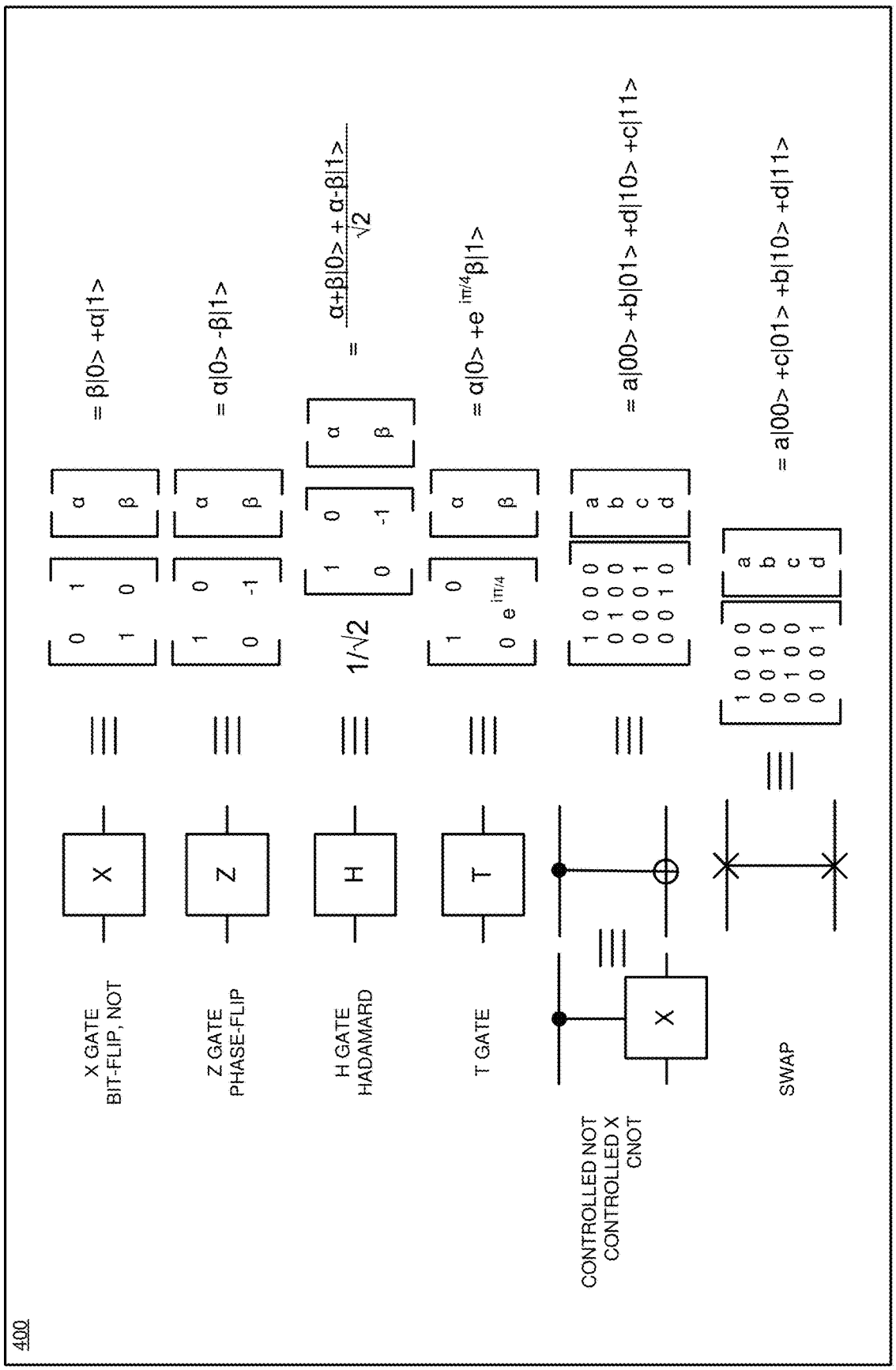
FIG. 4 depicts a simplified diagram of matrix representations of example general quantum circuit gates in accordance with an illustrative embodiment.

With reference to FIG. 4, this figure depicts a simplified diagram 400 of matrix representations of example general quantum circuit gates in accordance with an illustrative embodiment. In the illustrate example, matrix representations and corresponding linear equations of a bit-flip NOT (X) gate, a phase-flip (Z) gate, a Hadamard (H) gate, a phase shift (T) gate, a controlled NOT (controlled X or CNOT) gate, and a swap gate are shown.

Figure 5:
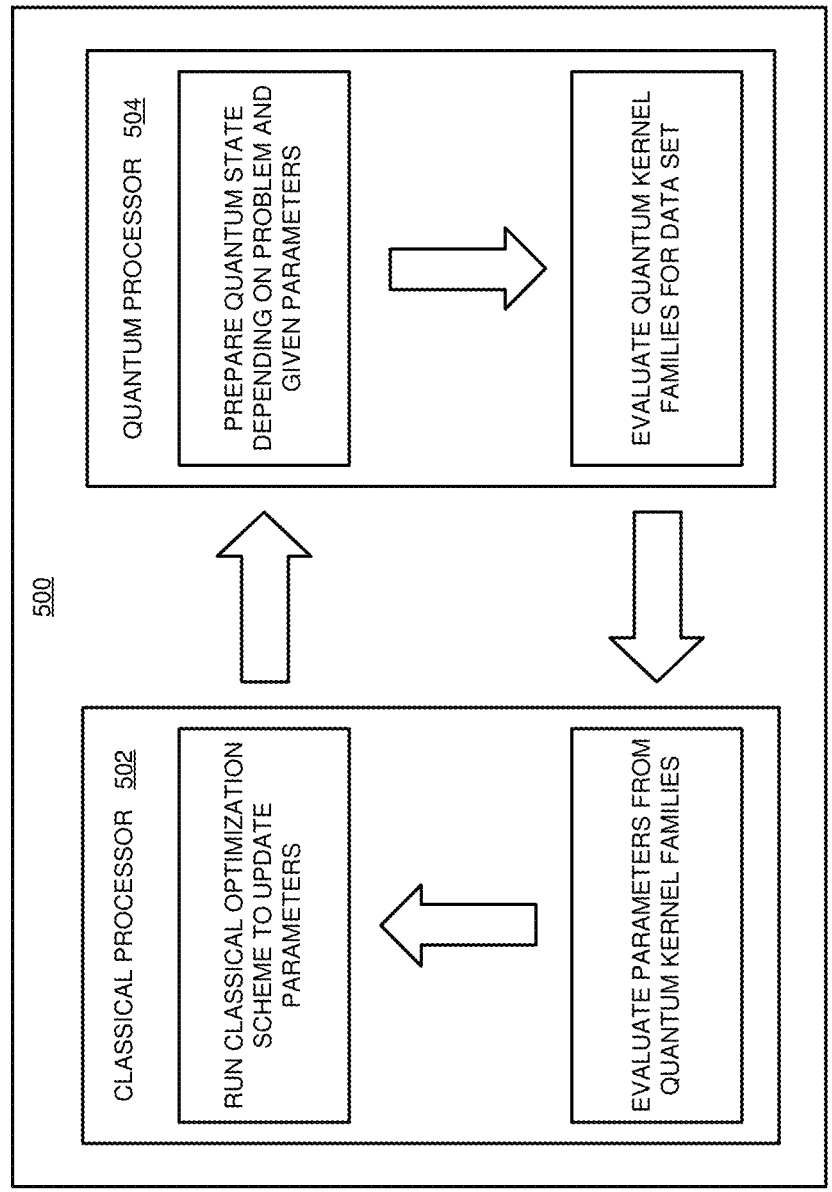
FIG. 5 depicts a block diagram of an example hybrid quantum/classical optimization algorithm for quantum feature kernel alignment using a classical processor and a quantum processor in accordance with an illustrative embodiment.

With reference to FIG. 5, this figure depicts a block diagram of an example hybrid quantum/classical optimization algorithm for quantum feature kernel alignment using a classical processor 502 and a quantum processor 504. In the example, classical processor 502 runs a classical optimization scheme to generate update parameters for a kernel alignment algorithm and sends the update parameters to quantum processor 504. Quantum processor 504 prepares a set of quantum feature map circuits depending on the particular combinatorial problem to be solved and the given update parameters. Quantum processor 504 executes the prepared quantum state and evaluates a set of quantum kernel families corresponding to the set of quantum feature map circuits. In an embodiment, the set of quantum kernels are from a single quantum kernel family. Classical processor 502 receives the evaluations from quantum processor 504 and evaluates the parameters of the set of quantum kernel families to determine if the parameters for the classical optimization scheme are to be updated.

If classical processor 502 determines that the parameters for the quantum feature kernel alignment optimization problem are to be updated, classical processor 502 runs the classical optimization scheme using the updated parameters to generated further updated parameters. Classical processor 502 then sends the further updated parameters to quantum processor 504. Typically, the process is repeated until convergence within an acceptable threshold is obtained.

Figure 6:
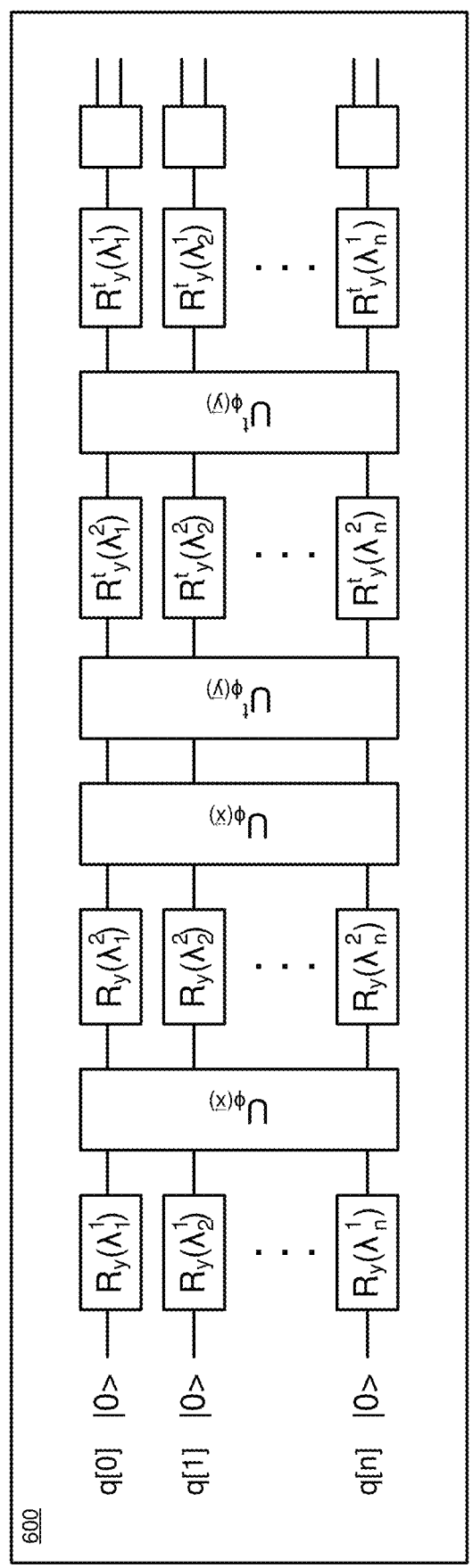
FIG. 6 depicts a block diagram of an example quantum feature map circuit for a kernel family using a hybrid classical-quantum computing system in accordance with an illustrative embodiment.

With reference to FIG. 6, this figure depicts a block diagram of an example quantum feature map circuit 600 for a kernel family using a hybrid classical-quantum computing system in accordance with an illustrative embodiment. In the example, quantum feature map circuit 600 applies a first layer of single qubit unitary rotation gates followed by a first diagonal phase gate component. The diagonal phase gate components of quantum feature map circuit 600 compute $U_{\Phi(\vec{x})} = \exp(i \sum_{S \subseteq [n]} \phi_S(\vec{x}) \prod_{i \in S} Z_i)$.

Quantum feature map circuit 600 further applies a second layer of single qubit unitary rotation gates followed by a second diagonal phase gate component. Quantum feature map circuit further applies a third diagonal phase gate component followed by a third layer of single qubit unitary rotation gates. Quantum feature map circuit 600 further applies a fourth diagonal phase gate component followed by a fourth layer of single qubit unitary rotation gates. Quantum feature map circuit 600 further applies a layer of measurements to the set of qubits.

As a result, an equivalent circuit is obtained to encode both the actual function value of the phase as well as the value of the Fourier transform for every basis element. A quantum feature map implemented by quantum feature map circuit 600 functions to make input data linearly separable into categories as required by an SVM/QSVM as it imposes hyperplanes on the "lifted" (e.g., feature map applied) data. The rotation angle for each layer of the single qubit unitary rotation gates depends on the optimized kernel parameters.

Figure 7:
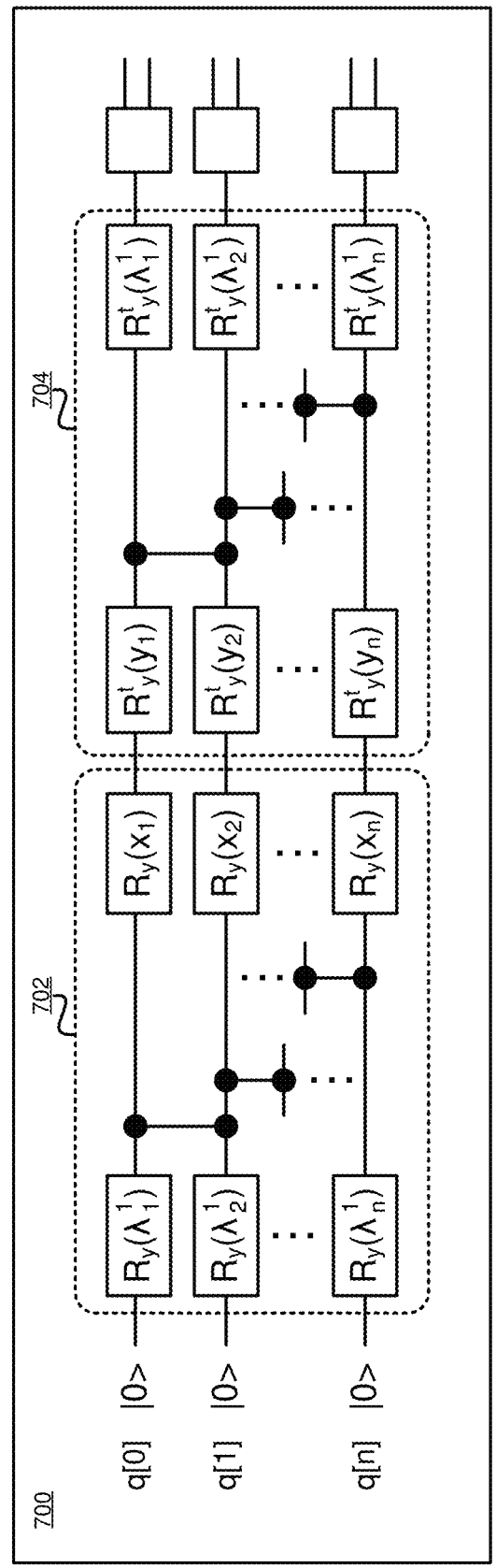
FIG. 7 depicts a block diagram of an example quantum feature map circuit for another kernel family using a hybrid classical-quantum computing system in accordance with an illustrative embodiment.

With reference to FIG. 7, this figure depicts a block diagram of an example quantum feature map circuit 700 for another kernel family using a hybrid classical-quantum computing system in accordance with an illustrative embodiment. In the example, quantum feature map circuit 700 applies a first layer of single qubit unitary rotation gates followed by a first layer of controlled phase gates.

Quantum feature map circuit 700 further applies a second layer of single qubit unitary rotation gates followed by a second layer of controlled phase gates. Quantum feature map circuit further applies a third layer of single qubit unitary rotation gates. Quantum feature map circuit 700 further applies a layer of measurements to the set of qubits.

As a result, an equivalent circuit is obtained to encode both the actual function value of the phase as well as the value of the Fourier transform for every basis element. A quantum feature map implemented by quantum feature map circuit 700 functions to make input data linearly separable into categories as required by an SVM/QSVM as it imposes hyperplanes on the "lifted" (e.g., feature map applied) data. The rotation angle for each layer of the single qubit unitary rotation gates depends on the optimized kernel parameters.

Quantum feature map circuit 700 includes a first portion 702 and a second portion 704. In an embodiment, first portion 702 is repeated d times, where d is a depth of the quantum feature map circuit 700. In an embodiment, second portion 704 is repeated d times, where d is a depth of the quantum feature map circuit 700.

Figure 8:
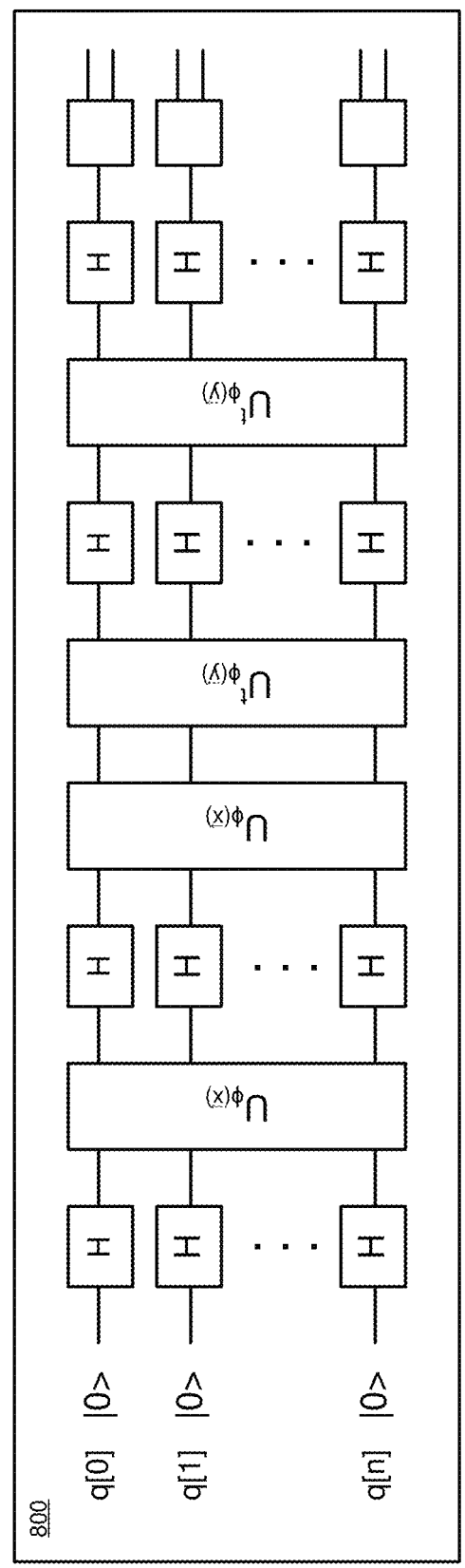
FIG. 8 depicts a block diagram of an example quantum feature map circuit for another kernel family using a hybrid classical-quantum computing system in accordance with an illustrative embodiment.

With reference to FIG. 8, this figure depicts a block diagram of an example quantum feature map circuit 800 for another kernel family using a hybrid classical-quantum computing system in accordance with an illustrative embodiment. In the example, quantum feature map circuit 800 applies a first layer of Hadamard gates followed by a first diagonal phase gate component.

Quantum feature map circuit 800 computes coefficients, $\phi_S$, from a classical neural network. The classical neural network includes a set of weights and a set of biases. In an embodiment, the quantum kernel family of quantum feature map circuit 800 includes a set of kernel parameters which are optimized in the quantum feature kernel alignment process. In an embodiment, the set of weights and the set of biases are the set of kernel parameters optimized in the quantum feature kernel alignment process. The diagonal phase gate components of quantum feature map circuit 800 compute $U_{\Phi(\vec{x})} = \exp(i \sum_{S \subseteq [n]} \phi_S(\vec{x}, \lambda) \prod_{i \in S} Z_i)$.

Quantum feature map circuit 800 further applies a second layer of Hadamard gates followed by a second diagonal phase gate component. Quantum feature map circuit further applies a third diagonal phase gate component followed by a third layer of Hadamard gates. Quantum feature map circuit 800 further applies a fourth diagonal phase gate component followed by a fourth layer of Hadamard gates.

Quantum feature map circuit 800 further applies a layer of measurements to the set of qubits. As a result, an equivalent circuit is obtained to encode both the actual function value of the phase as well as the value of the Fourier transform for every basis element. A quantum feature map implemented by quantum feature map circuit 800 functions to make input data linearly separable into categories as required by an SVM/QSVM as it imposes hyperplanes on the "lifted" (e.g., feature map applied) data. The rotation angle for each layer of the single qubit unitary rotation gates depends on the optimized kernel parameters.

Figure 9:
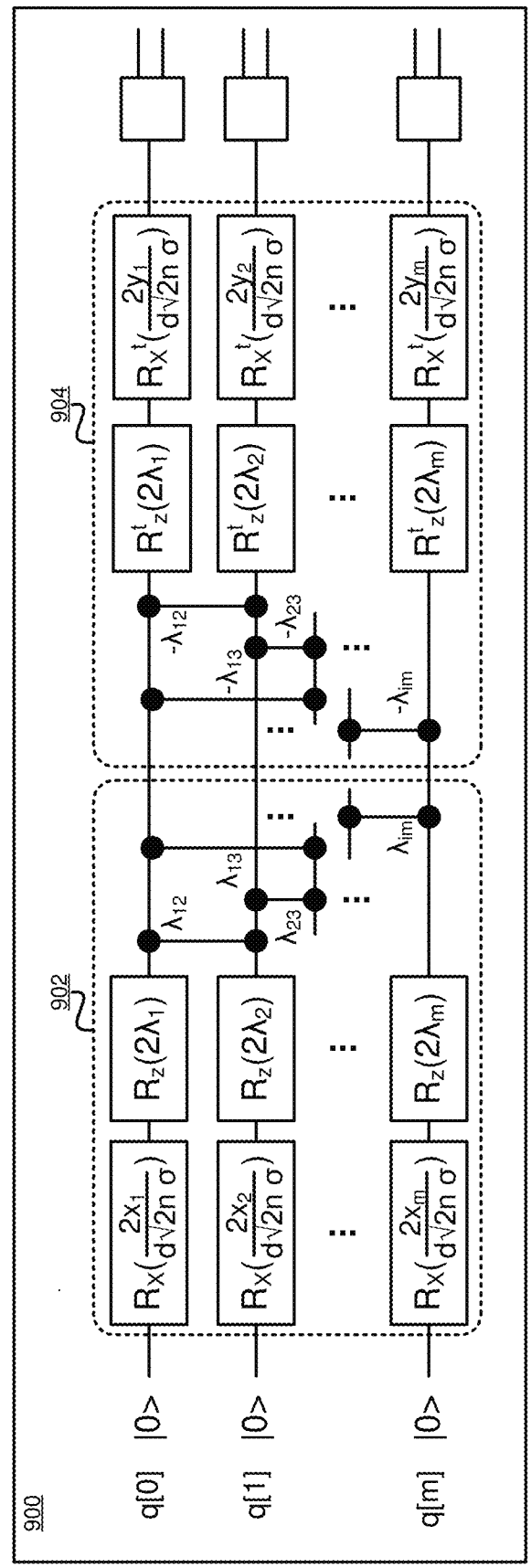
FIG. 9 depicts a block diagram of an example quantum feature map circuit for another kernel family using a hybrid classical-quantum computing system in accordance with an illustrative embodiment.

With reference to FIG. 9, this figure depicts a block diagram of an example quantum feature map circuit 900 for another kernel family using a hybrid classical-quantum computing system in accordance with an illustrative embodiment. In the example, quantum feature map circuit 900 applies a first layer of single qubit unitary rotation gates in a first direction followed by a second layer of single qubit unitary rotation gates in a second direction.

Quantum feature map circuit 900 further applies a first layer of controlled phase gates followed by a second layer of controlled phase gates. Quantum feature map circuit 900 further applies a third layer of single qubit unitary rotation gates in the second followed by a fourth layer of single qubit unitary rotation gates in the first direction. Quantum feature map circuit 900 further applies a layer of measurements to the set of qubits.

Quantum feature map circuit 900 includes a first portion 902 and a second portion 904. In an embodiment, first portion 902 is repeated d times, where d is a depth of the quantum feature map circuit 900. In an embodiment, second portion 904 is repeated d times, where d is a depth of the quantum feature map circuit 900.

As a result, an equivalent circuit is obtained to encode both the actual function value of the phase as well as the value of the Fourier transform for every basis element. A quantum feature map implemented by quantum feature map circuit 900 functions to make input data linearly separable into categories as required by an SVM/QSVM as it imposes hyperplanes on the "lifted" (e.g., feature map applied) data. The rotation angle for each layer of the single qubit unitary rotation gates depends on the optimized kernel parameters. The angles of the controlled phase gates for each layer corresponds to kernel parameters optimized in a quantum kernel alignment process.

Figure 10:
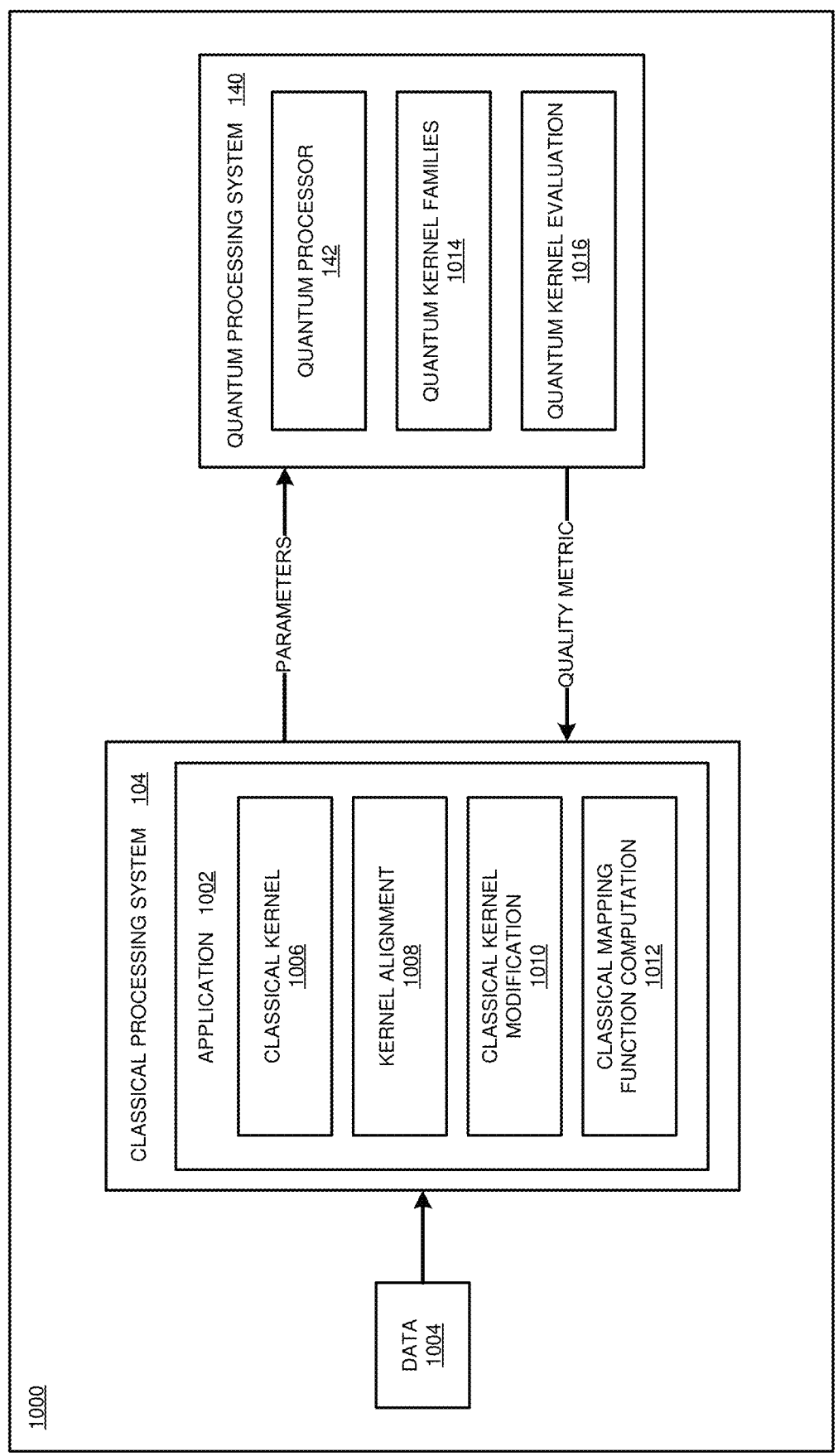
FIG. 10 depicts a block diagram of an example configuration for quantum feature kernel alignment using a hybrid classical-quantum computing system in accordance with an illustrative embodiment.

With reference to FIG. 10, this figure depicts a block diagram of an example configuration 1000 for quantum feature kernel alignment using a hybrid classical-quantum computing system in accordance with an illustrative embodiment. The example embodiment includes classical processing system 104 and quantum processing system 140. Classical processing system 104 includes an application 1002. In a particular embodiment, application 1002 is an example of application 105 of FIG. 1. Application 1002 is configured to received data 1004. In one or more embodiments, data 1004 includes one or more training data for training a classifier and input data for classification using the trained classifier. Application 1002 includes a sample selection component 1006, a kernel alignment component 1008, and a quantum parameter update component 1010. Quantum processing system 140 includes a quantum processor 142, a quantum mapping function computation component 1012, a set of quantum kernel families 1014, and a quantum mapping kernel evaluation component 1016.

In the embodiment, sample selection component 1006 is configured to select a sampling of objects from training data and provide the sampled objects to quantum processor 142 of quantum processing system 140. Quantum mapping function computation component 1012 is configured to apply a set of quantum feature maps corresponding to the set of quantum kernel families 1014 to the sampled objects configured as input vectors to generate output vectors. Quantum kernel evaluation component 1016 is configured to determine a quality metric for at least one of the sets of quantum feature maps corresponding to the set of quantum kernel families 1014.

Kernel alignment component 1008 is configured to use the determined quality metrics and the parameters from the quantum feature map circuit to identify a best quality quantum feature map circuit corresponding to the data 1004. Quantum parameter update component 1010 is configured to compute a new set of parameters for the quantum feature map circuit and determine whether the current function produces hybrid classical and quantum classifier having acceptable accuracy. In an embodiment, the parameters are governed by variable microwave pulses on the quantum processor 142. In particular embodiments, the microwave pulses are parameterized by varying the amplitude of the microwave pulses. In particular embodiments, the microwave pulses are parameterized by varying the phase of the microwave pulses.

Figure 11:
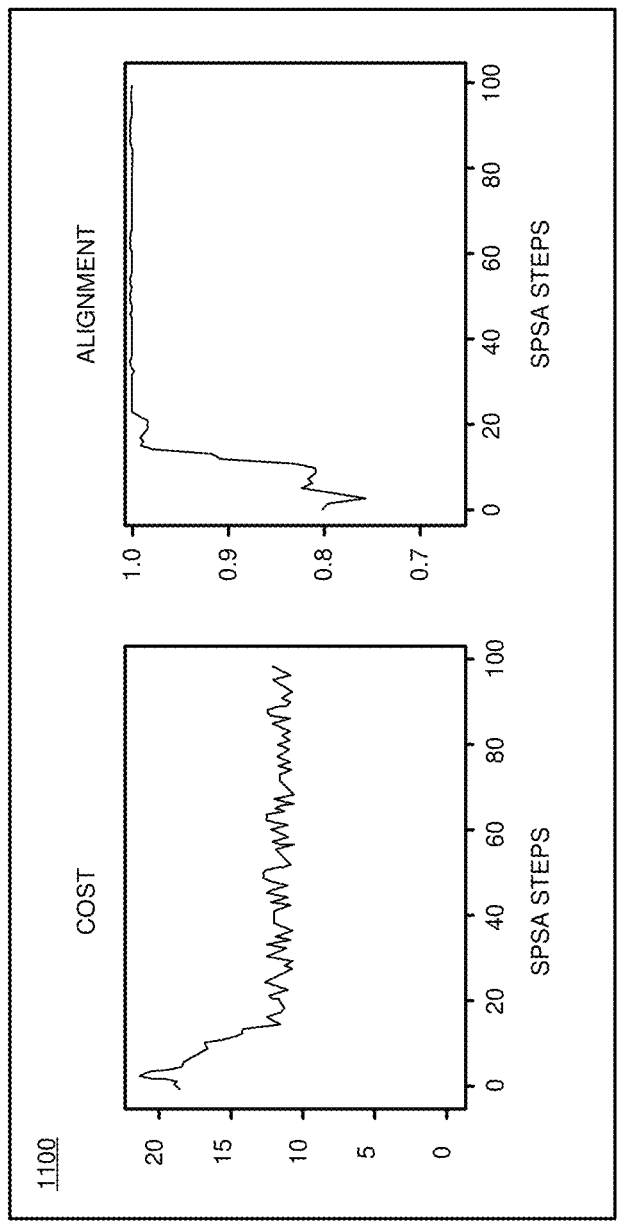
FIG. 11 depicts simulation results of the training data of a hybrid quantum-classical system for quantum feature kernel alignment.

With reference to FIG. 11, this figure depicts simulation results of the training data of a hybrid quantum-classical system for quantum feature kernel alignment. The hybrid quantum-classical system, whose training data is shown in FIG. 11, is based on the quantum feature map circuit 400 exhibited in FIG. 6.

In FIG. 11, the graphs represent the computing cost and alignment for a 2 qubit quantum processor. The graph of the alignment compares the parameterized kernel for the quantum feature map circuit with the kernel used to generate the training data. The graph of the alignment shows the alignment of the parameterized kernel approaching 100%.

Figure 12:
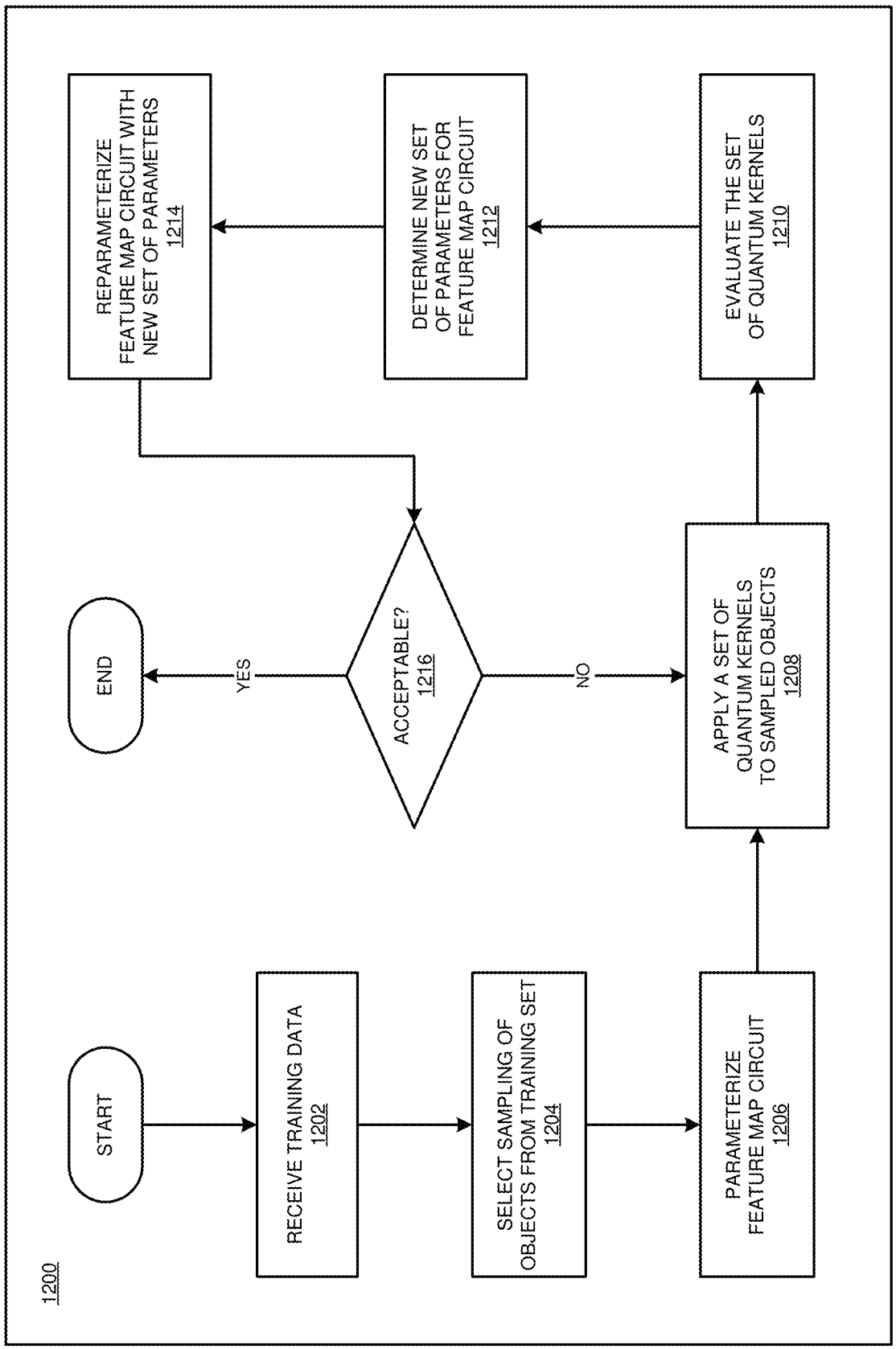
FIG. 12 depicts a flowchart of an example process for quantum feature kernel alignment using a hybrid classical-quantum computing system in accordance with an illustrative embodiment.

With reference to FIG. 12, this figure depicts a flowchart of an example process 1200 for quantum feature kernel alignment using a hybrid classical-quantum computing system in accordance with an illustrative embodiment. In block 1202, classical processor 122 receives a training data set containing training objects associated with one or more classification categories. In particular embodiments, an object within the training data is represented by one or more vectors. In block 1204, classical processor 122 selects a sampling of objects from the training data set. In a particular embodiment, classical processor 122 selects the objects from the training set using a random sampling. In one or more particular embodiments, the objects are randomly selected using a classical distance measure.

In block 1206, classical processor 122 parameterizes a quantum feature map circuit. In block 1208, quantum processor 142 applies a set of quantum feature maps corresponding to a set of quantum kernels to the input vectors of the sampled objects to compute output vectors. In an alternative embodiment, classical processing system 104 uses a simulation to apply the input vectors to the quantum feature map to generate the output vectors. In block 1210, quantum processor 142 evaluates the set of quantum kernels.

In block 1212, classical processor 122 determines a new set of parameters for the quantum feature map circuit. In block 1214, classical processor 122 reparameterizes the quantum feature map circuit with the new set of parameters. In block 1216, classical processor 122 determines whether the new (updated) quantum feature map circuit produces an acceptable level of accuracy, e.g., a measure of accuracy greater than a predetermined threshold value. In an embodiment, hybrid quantum/classical optimization algorithm 500 optimizes the value of the SVM objective function F. In an embodiment, a classical processor varies a set of parameters of a quantum kernel to minimize the SVM objective function F with respect to the set of quantum kernel parameters. In an embodiment, hybrid quantum/classical optimization algorithm 500 maximizes the SVM objective function with respect to the alignment of a quantum kernel.

If the new set of parameters does not produce a quantum feature map circuit with the acceptable level of accuracy, process 1200 continues to block 1208. In block 1208, quantum processor 142 determines new quantum kernels should be applied. Accordingly, portions of process 1200 are repeated iteratively until an acceptable level of accuracy is obtained. If classical processor 122 determines in block 1216, that an acceptable level of accuracy is obtained by the updated parameters of the current quantum feature map, process 1200 then ends. Accordingly, a trained hybrid classical-quantum classifier is produced. Upon receiving input data that is desired to be classified, the hybrid classical-quantum classifier classifies the received input data to determine a classification of the input data.

Thus, a computer implemented method, system or apparatus, and computer program product are provided in the illustrative embodiments for quantum space distance estimation for classifier and other quantum decision making system training using a hybrid classical-quantum computing system and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, including but not limited to computer-readable storage devices as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for hybrid classical-quantum decision maker training, the method comprising:
receiving a training data set;
selecting, by a first processor, a sampling of objects from the training data set, each object represented by at least one vector;
preparing a plurality of different quantum feature map circuits corresponding to a plurality of different quantum kernel families, wherein each quantum feature map circuit of the plurality of different quantum feature map circuits has a different respective arrangement of quantum gates;
identifying, from among the prepared plurality of different quantum feature map circuits, a quantum feature map circuit that satisfies a threshold level of accuracy by performing one or more iterations of an optimization algorithm, wherein each iteration comprises:
applying, by a quantum processor, a plurality of quantum feature maps to the selected sampling of objects, the plurality of quantum feature maps corresponding to the plurality of different quantum kernel families;
evaluating, by the quantum processor, parameters for quantum logic gates of the plurality of different quantum feature map circuits each corresponding to at least one of the plurality of quantum feature maps;
determining, by the first processor, a new set of parameters for the quantum logic gates of a quantum feature map circuit of the quantum feature map circuits; and
determining, by the first processor, whether the quantum feature map circuit with the new set of parameters for the quantum logic gates of the quantum feature map circuit satisfies the threshold level of accuracy, and
parameterizing, by the first processor, the quantum logic gates of the quantum feature map circuit with the new set of parameters that satisfy the threshold level of accuracy.

2. The method of claim 1, further comprising:
varying an amplitude of a microwave pulse of the quantum processor to parameterize the quantum feature map circuit.

3. The method of claim 1, further comprising:
varying a phase of a microwave pulse of the quantum processor to parameterize the quantum feature map circuit.

4. The method of claim 1, further comprising:
determining that the new set of parameters produces a measure of accuracy greater than a predetermined threshold value.

5. The method of claim 1, further comprising:
applying the parameterized quantum feature map circuit to the selected sampling of objects to compute new output vectors.

6. The method of claim 1, wherein the quantum feature map circuit includes a set of single qubit rotation gates.

7. The method of claim 6, wherein a subset of the set of single qubit rotation gates include a rotation angle.

8. The method of claim 7, wherein the rotation angle corresponds to the new set of parameters.

9. The method of claim 1, wherein the first processor is a classical processor.

10. The method of claim 1, wherein the set of parameters correspond to a set of weights and a set of biases of a neural network.

11. The method of claim 1, wherein the quantum feature map circuit includes a set of controlled phase gates.

12. The method of claim 11, wherein the set of controlled phase gates include a phase gate angle.

13. The method of claim 12, wherein the phase gate angle corresponds to the set of parameters.

14. A computer usable program product comprising one or more computer-readable storage devices, and program instructions stored on at least one of the one or more storage devices, the stored program instructions comprising:
program instructions to receive a training data set;
program instructions to select, by a first processor, a sampling of objects from the training set, each object represented by at least one vector;
program instructions to prepare a plurality of different quantum feature map circuits corresponding to a plurality of different quantum kernel families, wherein each quantum feature map circuit of the plurality of different quantum feature map circuits has a different respective arrangement of quantum gates;
program instructions to identify, from among the prepared plurality of different quantum feature map circuits, a quantum feature map circuit that satisfies a threshold level of accuracy by performing one or more iterations of an optimization algorithm, wherein each iteration comprises:
program instructions to apply, by a quantum processor, a plurality of quantum feature maps to the selected sampling of objects, the plurality of quantum feature maps corresponding to the plurality of different quantum kernel families;
program instructions to evaluate, by the quantum processor, parameters for quantum logic gates of the plurality of different quantum feature map circuits each corresponding to at least one of the plurality of quantum feature maps;
program instructions to determine, by the first processor, a new set of parameters for the quantum logic gates of a quantum feature map circuit of the quantum feature map circuits; and
program instructions to determine, by the first processor, whether the quantum feature map circuit with the new set of parameters for the quantum logic gates of the quantum feature map circuit satisfies the threshold level of accuracy; and
program instructions to parameterize, by the first processor, the quantum logic gates of the quantum feature map circuit with the new set of parameters that satisfy the threshold level of accuracy.

15. The computer usable program product of claim 14, further comprising:
program instructions to vary an amplitude of a microwave pulse of the quantum processor to parameterize the quantum feature map circuit.

16. The computer usable program product of claim 14, further comprising:
program instructions to vary a phase of a microwave pulse of the quantum processor to parameterize the quantum feature map circuit.

17. The computer usable program product of claim 14, further comprising:
program instructions to determine that the new set of parameters produces a measure of accuracy greater than a predetermined threshold value.

18. The computer usable program product of claim 14, wherein the program instructions are stored in a computer readable storage device in a data processing system, and wherein the program instructions are transferred over a network from a remote data processing system.

19. The computer usable program product of claim 14, wherein the program instructions are stored in a computer readable storage device in a server data processing system, and wherein the program instructions are downloaded over a network to a remote data processing system for use in a computer readable storage device associated with the remote data processing system.

20. A computer system comprising one or more processors, one or more computer-readable memories, and one or more computer-readable storage devices, and program instructions stored on at least one of the one or more computer-readable storage devices for execution by at least one of the one or more processors via at least one of the one or more computer-readable memories, the stored program instructions comprising:
program instructions to receive a training data set;
program instructions to select, by a first processor, a sampling of objects from the training set, each object represented by at least one vector;
program instructions to prepare a plurality of different quantum feature map circuits corresponding to a plurality of different quantum kernel families, wherein each quantum feature map circuit of the plurality of different quantum feature map circuits has a different respective arrangement of quantum gates;
program instructions to identify, from among the prepared plurality of different quantum feature map circuits, a quantum feature map circuit that satisfies a threshold level of accuracy by performing one or more iterations of an optimization algorithm, wherein each iteration comprises:
program instructions to apply, by a quantum processor, a plurality of quantum feature maps to the selected sampling of objects, the plurality of quantum feature maps corresponding to the plurality of different quantum kernel families;
program instructions to evaluate, by the quantum processor, parameters for quantum logic gates of the plurality of different quantum feature map circuits each corresponding to at least one of the plurality of quantum feature maps;
program instructions to determine, by the first processor, a new set of parameters for the quantum logic gates of a quantum feature map circuit of the quantum feature map circuits; and
program instructions to determine, by the first processor, whether the quantum feature map circuit with the new set of parameters for the quantum logic gates of the quantum feature map circuit satisfies the threshold level of accuracy; and
program instructions to parameterize, by the first processor, the quantum logic gates of the quantum feature map circuit with the new set of parameters that satisfy the threshold level of accuracy.

* * * * *